US008686588B2

(12) United States Patent
Soemantri et al.

(10) Patent No.: US 8,686,588 B2
(45) Date of Patent: Apr. 1, 2014

(54) DEVICE ARRANGEMENT COMPRISING AN ELECTRONIC DEVICE AND A POWER ADAPTER AND METHOD FOR CONNECTING A POWER ADAPTER

(75) Inventors: Albertus Soemantri, Friedberg (DE); Erwin Bässler, Königshrunn (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 489 days.

(21) Appl. No.: 13/151,812

(22) Filed: Jun. 2, 2011

(65) Prior Publication Data

US 2011/0266874 A1 Nov. 3, 2011

Related U.S. Application Data

(63) Continuation of application No. PCT/EP2009/066070, filed on Nov. 30, 2009.

(30) Foreign Application Priority Data

Dec. 3, 2008 (DE) .......................... 10 2008 060 274

(51) Int. Cl.
*H02J 3/02* (2006.01)
(52) U.S. Cl.
USPC ................................................ 307/3; 307/66
(58) Field of Classification Search
USPC .................. 307/3, 66; 320/107, 127
See application file for complete search history.

(56) References Cited

U.S. PATENT DOCUMENTS

| 5,570,002 | A | 10/1996 | Castleman |
| 5,590,343 | A | 12/1996 | Bolan et al. |
| 6,054,846 | A | 4/2000 | Castleman |
| 6,058,034 | A | 5/2000 | Cummings et al. |
| 6,842,868 | B1 | 1/2005 | Brown et al. |

(Continued)

FOREIGN PATENT DOCUMENTS

| DE | 37 44 733 | 2/1989 |
| DE | 42 13 096 | 10/1993 |

(Continued)

*Primary Examiner* — Daniel Cavallari
(74) *Attorney, Agent, or Firm* — DLA Piper LLP (US)

(57) ABSTRACT

A device arrangement includes an electronic device having a rechargeable battery and a power adapter which can be electrically coupled to the electronic device and has a converter circuit for producing at least one operating voltage ($U_B$) for the electronic device from a supply voltage from a power supply system at a voltage output, wherein the operating voltage ($U_B$) is a DC voltage, the voltage output of the electronic device and the power adapter can be connected to one another via at least one power supply line to transmit the DC voltage, and the electronic device has a monitor that monitors at least one state of the electronic device and/or of the rechargeable battery, a first controller that produces at least one control signal (S) as a function of the monitored state, and a first signal device that signals the produced signal (S) to the power adapter, which first signal device is designed to modulate a radio-frequency AC voltage signal which is associated with the control signal (S), onto the power supply line, and the power adapter has a power supply system disconnector that electrically disconnects the converter circuit from the power supply system, a second signal device that identifies a signaled control signal (S) from the first signal device, which second signal device is capacitively coupled to the voltage output and designed to demodulate the modulated control signal (S) from the radio-frequency AC voltage signal, and a second controller that operates the power supply system disconnector as a function of the identified control signal (S).

15 Claims, 6 Drawing Sheets

(56) References Cited

U.S. PATENT DOCUMENTS

| | | |
|---|---|---|
| 6,895,516 B2 | 5/2005 | Odaohhara |
| 6,913,477 B2 | 7/2005 | Dayan et al. |
| 7,113,102 B2 | 9/2006 | Soemantri |
| 2002/0023235 A1 | 2/2002 | Odaohhara |
| 2002/0113907 A1 | 8/2002 | Endo et al. |
| 2003/0052644 A1* | 3/2003 | Nelson et al. ............ 320/107 |
| 2004/0082369 A1 | 4/2004 | Dayan et al. |
| 2008/0086553 A1 | 4/2008 | Theobald |
| 2009/0034159 A1 | 2/2009 | Froeschi et al. |

FOREIGN PATENT DOCUMENTS

| | | |
|---|---|---|
| DE | 196 28 767 | 4/1998 |
| DE | 10 2004 038 606 | 2/2006 |
| DE | 10 2006 005 334 | 8/2007 |
| EP | 0996050 | 4/2000 |
| EP | 1 577 998 A1 | 9/2005 |
| JP | 11-259187 A | 9/1999 |
| JP | 2002-41188 | 2/2002 |
| JP | 2002-62952 A | 2/2002 |
| JP | 2002-108513 | 4/2002 |
| JP | 2005-278303 A | 10/2005 |
| KR | 1999-006180 | 2/1999 |
| KR | 2002-0001074 | 1/2002 |
| WO | 99/44116 | 9/1999 |
| WO | 2007/107157 | 9/2007 |

\* cited by examiner

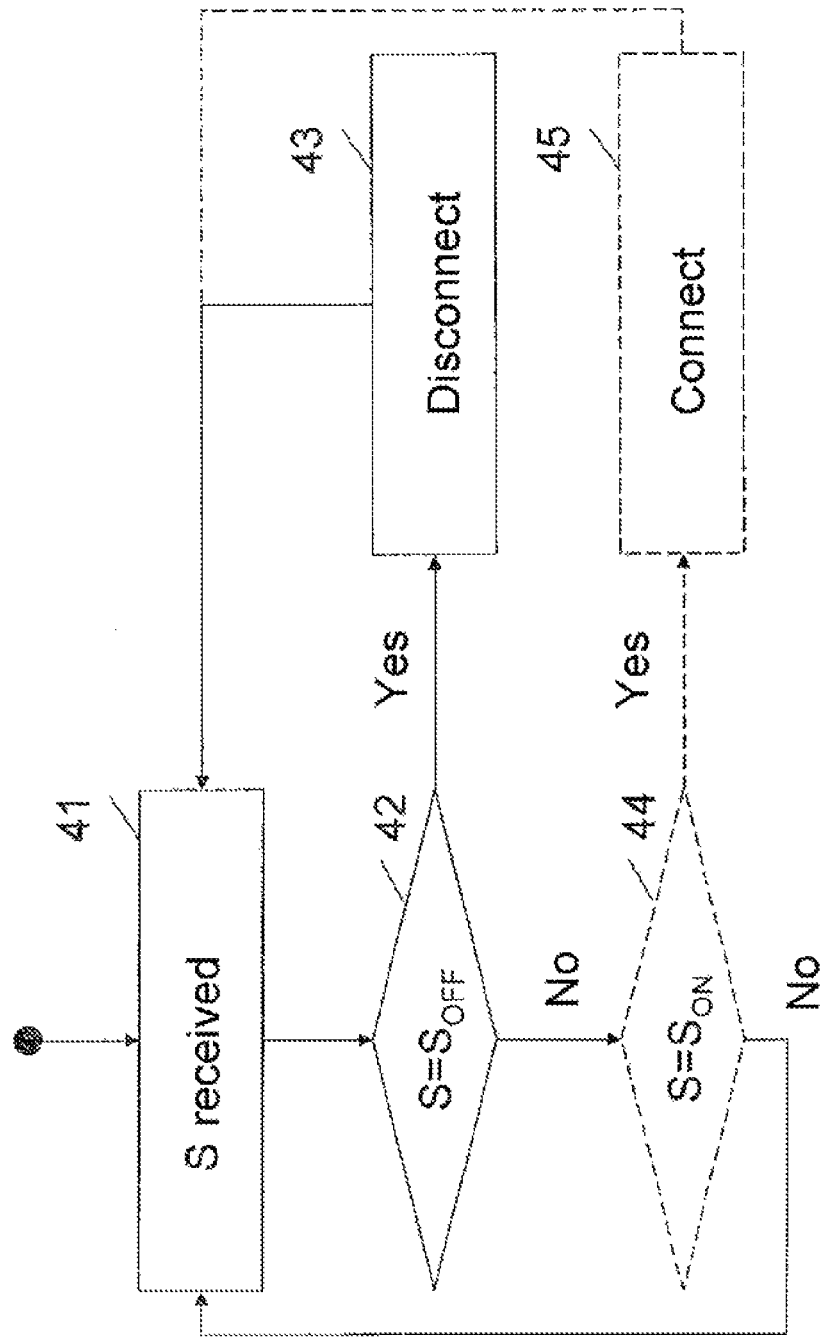

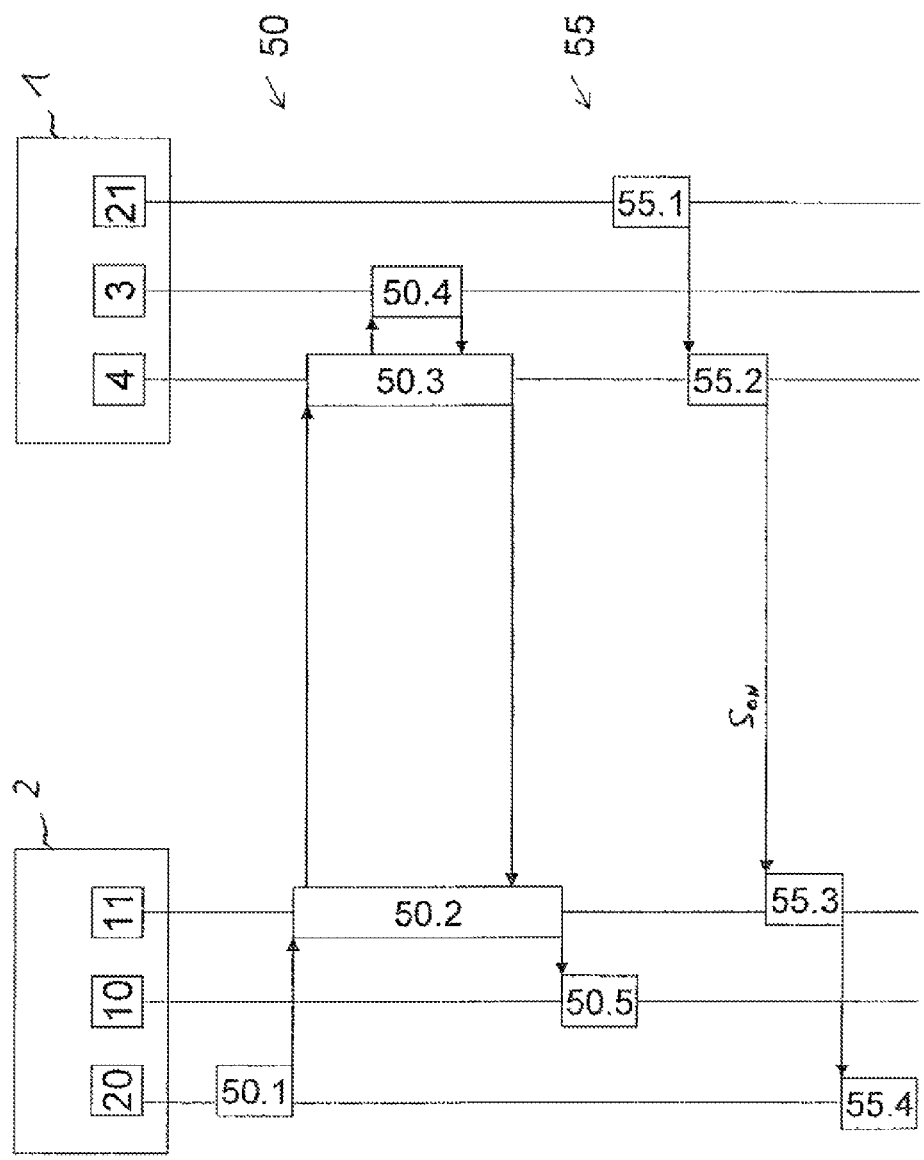

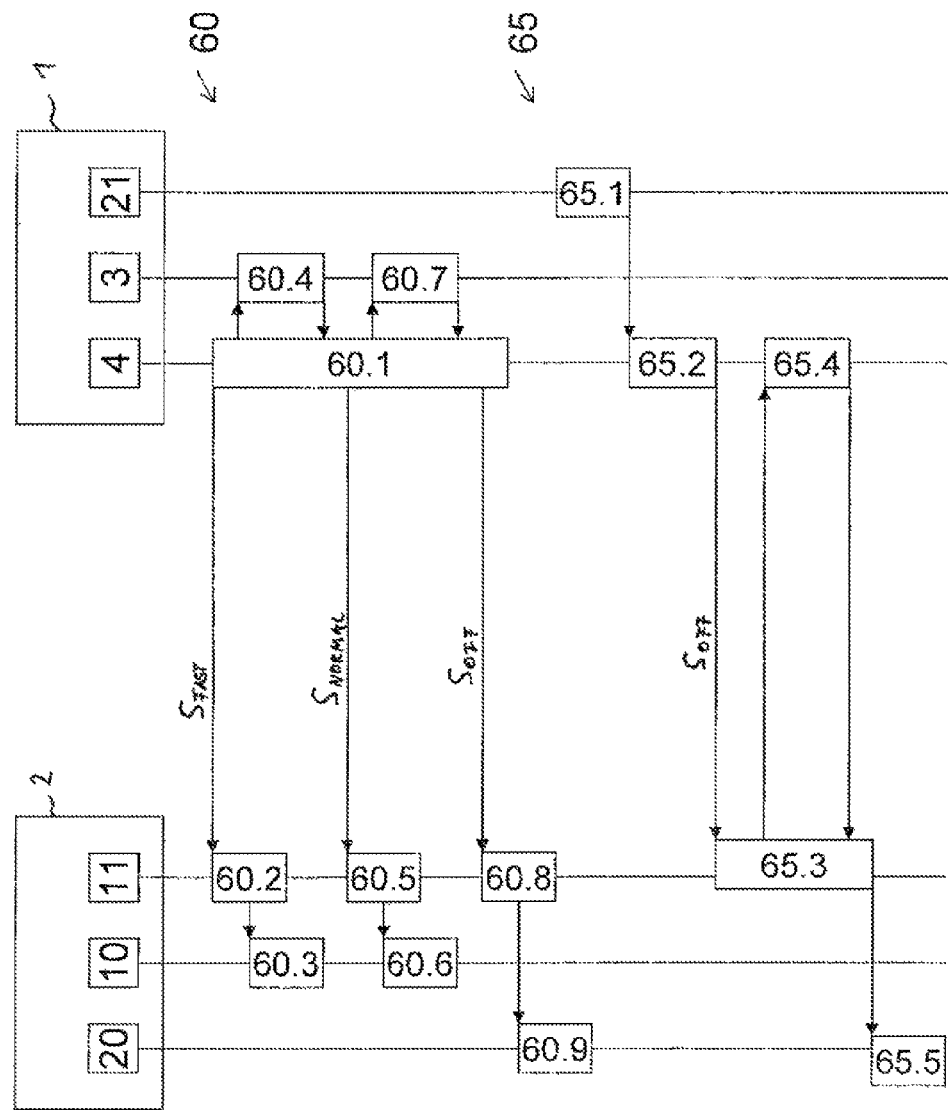

DEVICE ARRANGEMENT COMPRISING AN ELECTRONIC DEVICE AND A POWER ADAPTER AND METHOD FOR CONNECTING A POWER ADAPTER

RELATED APPLICATIONS

This is a continuation of International Application No. PCT/EP2009/066070, with an international filing date of Nov. 30, 2009, which is based on German Patent Application No. 10 2008 060 274.4, filed Dec. 3, 2008, the subject matter of which is incorporated by reference.

TECHNICAL FIELD

This disclosure relates to a device arrangement comprising an electronic device, having a rechargeable battery, and a power adapter which can be electrically coupled to the electronic device and has a converter circuit for producing at least one operating voltage for the electronic device from a supply voltage from a power supply system. Furthermore, the disclosure relates to a method for switching a power adapter for an electronic device.

BACKGROUND

Device arrangements comprising an electronic device and a power adapter which can be electrically coupled to the electronic device are widely known. By way of example, in the case of so-called laptop computers with rechargeable batteries which are built-in or can be inserted, external switched-mode power adapters are generally used to supply the electronic device with an operating voltage which is used inter alia to charge the rechargeable battery in the electronic device. In mobile use, the electronic device is supplied with power from the rechargeable battery as a result of which there is no need to also take the power adapter.

Device arrangements such as these have the disadvantage, among others, that the power adapter always results in a small power loss, irrespective of the operating state of the electronic device. When the electronic device is switched off or the electrical connection between the electronic device and the power adapter is disconnected, the power adapter continues to consume electrical power, which is a waste for the electronic device.

It could therefore be helpful to improve the energy balance of such device arrangements. In particular, it could be helpful to provide a device arrangement comprising an electronic device and a power adapter which can be electrically coupled to the electronic device, as well as a method for switching a power adapter for an electronic device, which reduce the electrical power consumption, particularly during periods when the electronic device is not in use. Preferably, the power adapter should not consume any electrical power at all from a power supply system when such power is not required by the electronic device.

SUMMARY

We provide a device arrangement including an electronic device having a rechargeable battery and a power adapter which can be electrically coupled to the electronic device and has a converter circuit for producing at least one operating voltage ($U_B$) for the electronic device from a supply voltage from a power supply system at a voltage output, wherein the operating voltage ($U_B$) is a DC voltage, the voltage output of the electronic device and the power adapter can be connected to one another via at least one power supply line to transmit the DC voltage, and the electronic device has a monitor that monitors at least one state of the electronic device and/or of the rechargeable battery, a first controller that produces at least one control signal (S) as a function of the monitored state, and a first signal device that signals the produced signal (S) to the power adapter, which first signal device is designed to modulate a radio-frequency AC voltage signal which is associated with the control signal (S), onto the power supply line, and the power adapter has a power supply system disconnector that electrically disconnects the converter circuit from the power supply system, a second signal device that identifies a signaled control signal (S) from the first signal device, which second signal device is capacitively coupled to the voltage output and designed to demodulate the modulated control signal (S) from the radio-frequency AC voltage signal, and a second controller that operates the power supply system disconnector as a function of the identified control signal (S).

We further provide a method for switching a power adapter having a voltage output for connecting an electronic device, wherein the electronic device and the power adapter can be connected to one another via at least one power supply line for transmitting a DC voltage from the voltage output for operation of the electronic device, including monitoring a state of the electronic device and/or a state of a rechargeable battery for the electronic device, producing at least one control signal (S) as a function of the monitored state by the electronic device, signaling the at least one produced control signal (S) from the electronic device to the power adapter by modulating a radio-frequency AC voltage signal associated with the control signal (S) onto the power supply line; identifying the signaled control signal (S) with the power adapter by demodulating the modulated control signal (S) from the radio-frequency AC voltage signal, and operating a power supply system disconnector in the power adapter that disconnects or connects a converter circuit from or to a power supply system when the power adapter has identified a switch-off signal ($S_{OFF}$) or a switch-on signal ($S_{ON}$) in the identification step.

BRIEF DESCRIPTION OF THE DRAWINGS

FIG. 4 shows a flowchart of a method for monitoring signaling of control signals to a power adapter.

FIG. 5 shows two collaboration diagrams for a device arrangement comprising an electronic device and a power adapter.

FIG. 6 shows two further collaboration diagrams for a device arrangement comprising an electronic device and a power adapter.

LIST OF REFERENCE SYMBOLS

Figure 1:
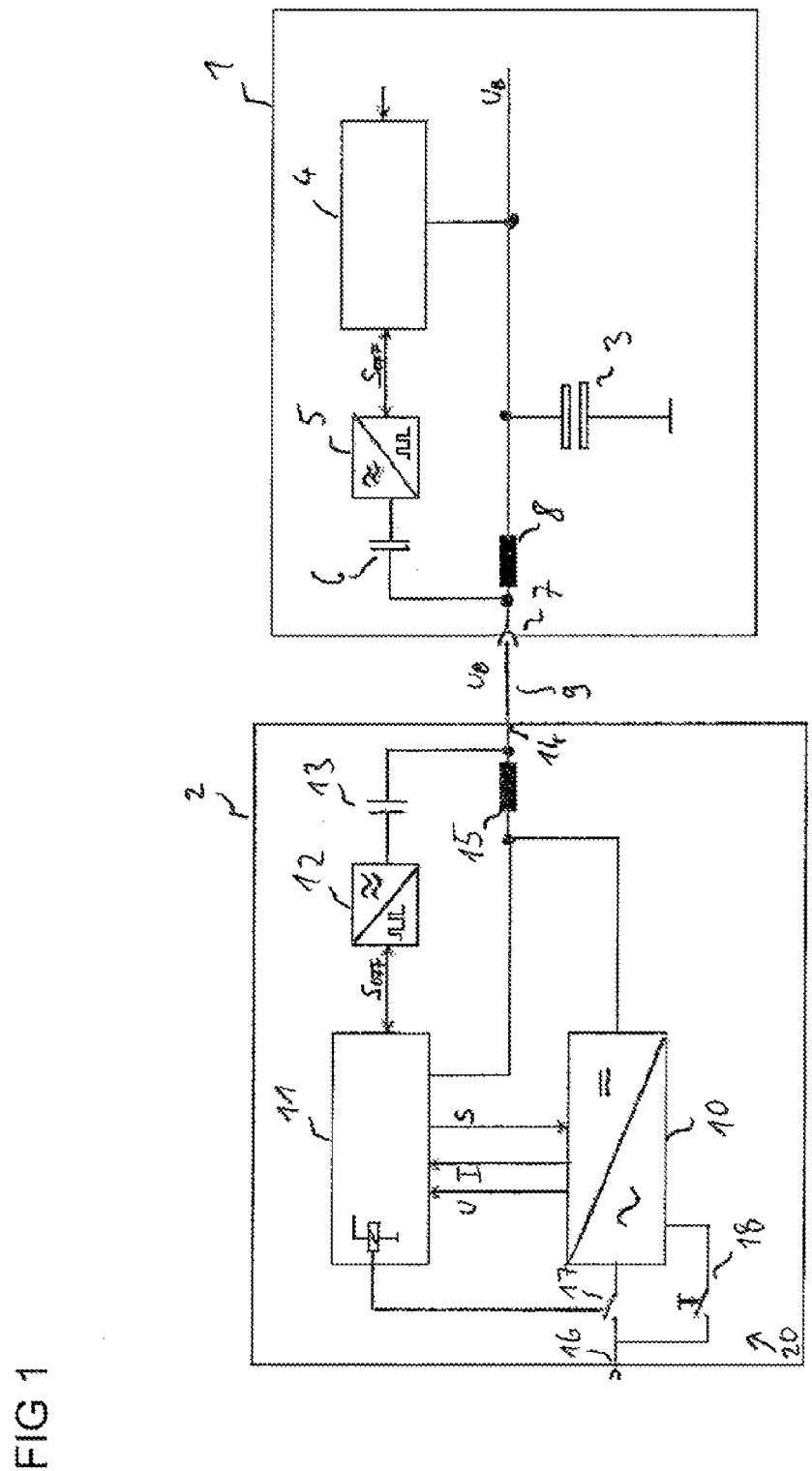
FIG. 1 shows a device arrangement according to a first example.

1 Electronic device
2 Power adapter
3 Rechargeable battery
4 First controller
5 Modulation apparatus
6 First capacitor
7 Operating voltage input 8 First coil
9 Power supply line
10 Converter circuit
11 Second controller
12 Demodulation apparatus
13 Second capacitor
14 Voltage output
15 Second coil
16 Power supply system input
17 First switching element
18 Second switching element
19 Data line
20 Power supply system disconnecting means
21 Further component
50 First scenario
55 Second scenario
60 Third scenario
65 Fourth scenario
I Operating current
$U_B$ Operating voltage
$U_{BATT}$ Battery voltage
S Control signal

DETAILED DESCRIPTION

We thus provide a device arrangement of the type mentioned initially, wherein the electronic device has monitoring means that monitors at least one state of the electronic device and/or of the rechargeable battery, first control means that produce at least one control signal as a function of the monitored state, and first signaling means that signals the produced control signal to the power adapter. In addition, the power adapter has power supply system disconnecting means that electrically disconnects the converter circuit from the power supply system, second signaling means that identifies a signaled control signal from the first signaling means, and second control means that operates the power supply system disconnecting means as a function of the identified control signal.

The capability to monitor a state of an electronic device, for example, an operating state or energy-saving state, and/or to monitor a rechargeable battery, for example, a state of charge, and the capability to signal from the electronic device to the power adapter, and the provision of a power supply system disconnecting means for electrically disconnecting the converter circuit from the power supply system while receiving a control signal which is signaled by the electronic device, allows the power adapter to be completely disconnected from the power supply system when the electronic device finds that it does not require more energy from the power adapter. For example, the power adapter can be disconnected from the power supply system when the electronic device is in a standby state and the rechargeable battery is at least partially charged.

The second control means may be designed to disconnect the converter circuit from the power supply system with the power supply system disconnecting means on identifying a switch-off signal of the first control means. The second control means may furthermore be designed to connect the converter circuit to the power supply system on identifying a switch-on signal. A control means such as this allows the power adapter to be automatically disconnected from and reconnected to the power supply system when the electronic device signals that it would be advantageous to switch the power adapter off or on in the present operating situation.

The operating voltage may be a DC voltage, and the electronic device and the power adapter may be connected to one another via at least one power supply line for transmitting the DC voltage, wherein the first signaling means are designed for modulating an AC voltage signal, which is associated with the control signal, onto the power supply line and the second signaling means are designed for demodulating the modulated control signal. Modulating an AC voltage signal onto a DC voltage for operating the electronic device allows signaling to take place from the electronic device to the power adapter without using additional lines.

The electronic device and the power adapter may be connected to one another via at least one data line for transmitting control signals, wherein the first signaling means are designed for transmitting the control signal via the at least one data line to the second signaling means. The use of a data line for transmitting control signals from the electronic device to the power adapter makes it possible to simplify the data transmission between the first signaling means and the second signaling means.

The device arrangement may be characterized in that the second signaling means are additionally designed for transmitting control signals to the first signaling means. If the second signaling means are additionally designed for transmitting control signals from the power adapter to the electronic device, bidirectional communication is possible between the electronic device and the power adapter, thus also making it possible to interchange complex demands, relating to the operating currents and voltages which are required and/or can be produced by the power adapter, for different operating situations of the electronic device.

The power supply system disconnecting means may have an electrically operable switching element, and the second control means may be designed to apply an electrical switching voltage obtained from the rechargeable battery, to the electrically operable switching element. An electrically operable switching element to which an electrical switching voltage obtained from the rechargeable battery can be applied allows the power adapter to be connected to the power supply system without an additional power source in the power adapter.

The power supply system disconnecting means additionally may have a manually operable switching element, wherein the manually operable switching element is designed for switching on the power adapter independently of a voltage of the rechargeable battery. The use of an additional, manually operable switching element allows the power adapter to be restarted even with a rechargeable battery which has been completely discharged.

We also provide a method for switching a power adapter for an electronic device, which method comprises the following steps:
  monitoring a state of the electronic device and/or the state of a rechargeable battery for the electronic device;
  producing at least one control signal as a function of the monitored state by the electronic device;
  signaling the at least one produced control signal from the electronic device to the power adapter;
  identifying the signaled control signal; and
  operating a power supply system disconnecting means in the power adapter for disconnecting or connecting a converter circuit from or to a power supply system when a switch-off signal or a switch-on signal has been identified in the identification step.

The above-mentioned steps allow the power adapter to be automatically disconnected from the power supply system in those situations in which the electronic device does not require any further operating energy from the power supply system. The connection of the converter circuit to the power supply system when a switch-on signal has been identified allows the power adapter to be operated as required by the electronic device.

Further advantageous refinements are discussed in the following comprehensive description. Our arrangements and methods will be described in the following text with reference to a number of examples, which will be explained in more detail using figures.

FIG. 1 shows a device arrangement comprising an electronic device 1 and a power adapter 2. The electronic device 1, for example, a laptop computer comprises a rechargeable battery 3, a first controller 4 and a modulation apparatus 5. The modulation apparatus 5 is capacitively coupled to an operating voltage input 7 with a first capacitor 6. The DC voltage $U_B$ provided via the operating voltage input 7 is transmitted via a first filter coil 8 to the rechargeable battery 3, the first controller 4 and further components which are contained in the electronic device 1, such as a processor (not illustrated in FIG. 1).

The electronic device 1 is connected to the power adapter 2 via a power supply line 9. The power adapter 2 comprises a converter circuit 10, a second controller 11 and a demodulation apparatus 12. The demodulation apparatus 12 is coupled to the second controller 11, and is capacitively coupled via a second capacitor 13 to a voltage output 14 of the power adapter 2. The converter circuit 10 is optionally likewise connected to the second controller 11, and can be operated by the second controller 11. By way of example, the controller 11 may control an output voltage of the converter circuit 10 by pulse-width modulation. Furthermore, the second controller 11 can monitor an operating voltage $U_B$ which is produced at that time by the converter circuit 10, or an output operating current I.

The secondary side of the converter circuit 10 provides the operating voltage $U_B$ via a second filter coil 15 at the voltage output 14. The primary side of the converter circuit 10 is connected to a power supply system input 16 of the power adapter 2. The power supply system input 16 can be coupled to the converter circuit 10 via a first, electrically operable switching element 17, or a second, manually operable switching element 18. By way of example, the first switching element 17 is an electromechanical, electro-optical or electronic relay, or a thyristor. By way of example, the second switching element 18 is a power button or switch. Together, the first switching element 17 and the second switching element 18 form a power supply system disconnecting means 20, which is used for selective coupling or disconnection of the converter circuit 10 and power supply system input 16.

The device arrangement illustrated schematically in FIG. 1 operates as follows. When the converter circuit 10 is connected to a power supply system voltage via the first switching element 17 or the second switching element 18, a DC voltage provided by the converter circuit 10 is transmitted via the power supply line 9 to the electronic device. When the first controller 4 in the electronic device 1 identifies that there is no longer any need for the power adapter 2 to continue to provide the operating voltage $U_B$, for example, because the electronic device 1 is in a switched-off state or in a standby state and the rechargeable battery 3 is at least partially, largely or completely charged, it produces a switch-off signal $S_{OFF}$. The switch-off signal $S_{OFF}$ is transmitted by the modulation apparatus 5 as a radio-frequency AC voltage signal via the power supply line 9 to the demodulation apparatus 12 which decodes it. The second control apparatus 11 identifies the decoded switch-off signal $S_{OFF}$ and in response to this disconnects the converter circuit 10 from the power supply system input 16. By way of example, the second controller 11 can galvanically isolate the converter circuit 10 from the power supply system input 16 by suitable connection of a relay. When the converter circuit 10 has been disconnected from the power supply system, it does not consume any further power therefrom.

If the electronic device 1 is still consuming electrical power, for example, to monitor events in a standby state, the rechargeable battery 3 is discharged as time passes. When the rechargeable battery 3 undershoots a critical threshold, for example, a battery voltage monitored by the first controller 4, the first controller 4 signals to the second controller 11, as described above, that the converter circuit 10 should once again be connected to the power supply system input 16. By way of example, this is done by the second controller closing the first switching element 17.

It should be noted that the functions described above can be carried out by unidirectional communication from the electronic device 1 to the power adapter 2, that is to say without a return channel from the power adapter 2 to the electronic device 1. The arrangement as shown in FIG. 1 can, of course, be extended by using modulators and demodulators in the power adapter 2 and the electronic device 1 for bidirectional communication to implement further control methods which will be described in the following text.

Figure 2:
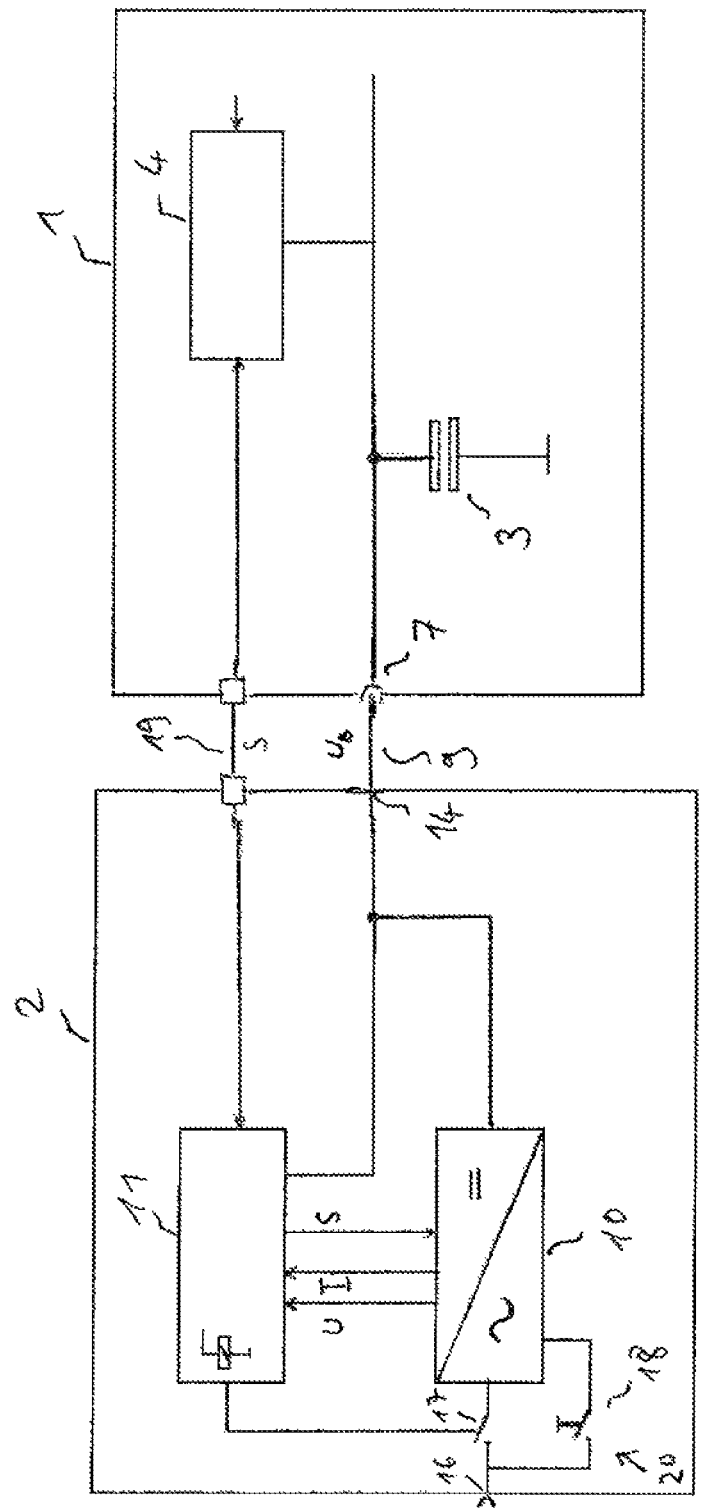
FIG. 2 shows a device arrangement according to a second example.

FIG. 2 shows another example of a device arrangement comprising an electronic device 1 and a power adapter 2. In contrast to the example illustrated in FIG. 1, the electronic device 1 and the power adapter 2 are coupled to one another via two different connections, as shown in FIG. 2. A power supply line 9 is used for transmitting an operating voltage $U_B$ from the power adapter 2 to the electronic device 1. In addition, the electronic device 1 and the power adapter 2 are connected to one another via a data line 19. By way of example, the data line 19 may be a USB or I²C connection. The lines 9 and 19 may be in the form of separate connections, for example, standardized jack plug and USB connections, or they may be in the form of different lines of a common plug connection.

Although the example illustrated in FIG. 2 uses an additional data line 19 in comparison to the example illustrated in FIG. 1, the device arrangement shown in FIG. 2 has the additional advantage that there is no need to modulate control signals onto the operating DC voltage $U_B$. In addition, the arrangement illustrated in FIG. 2 has the advantage that it allows bidirectional communication between a first controller 4 for the electronic device 1, and a second controller 11 for the power adapter 2. Particularly flexible control methods can therefore be carried out using the device arrangement 1 shown in FIG. 2. Furthermore, there is no need to use filter elements for electrical decoupling of DC and AC voltage components in the arrangement shown in FIG. 2.

Figure 3:
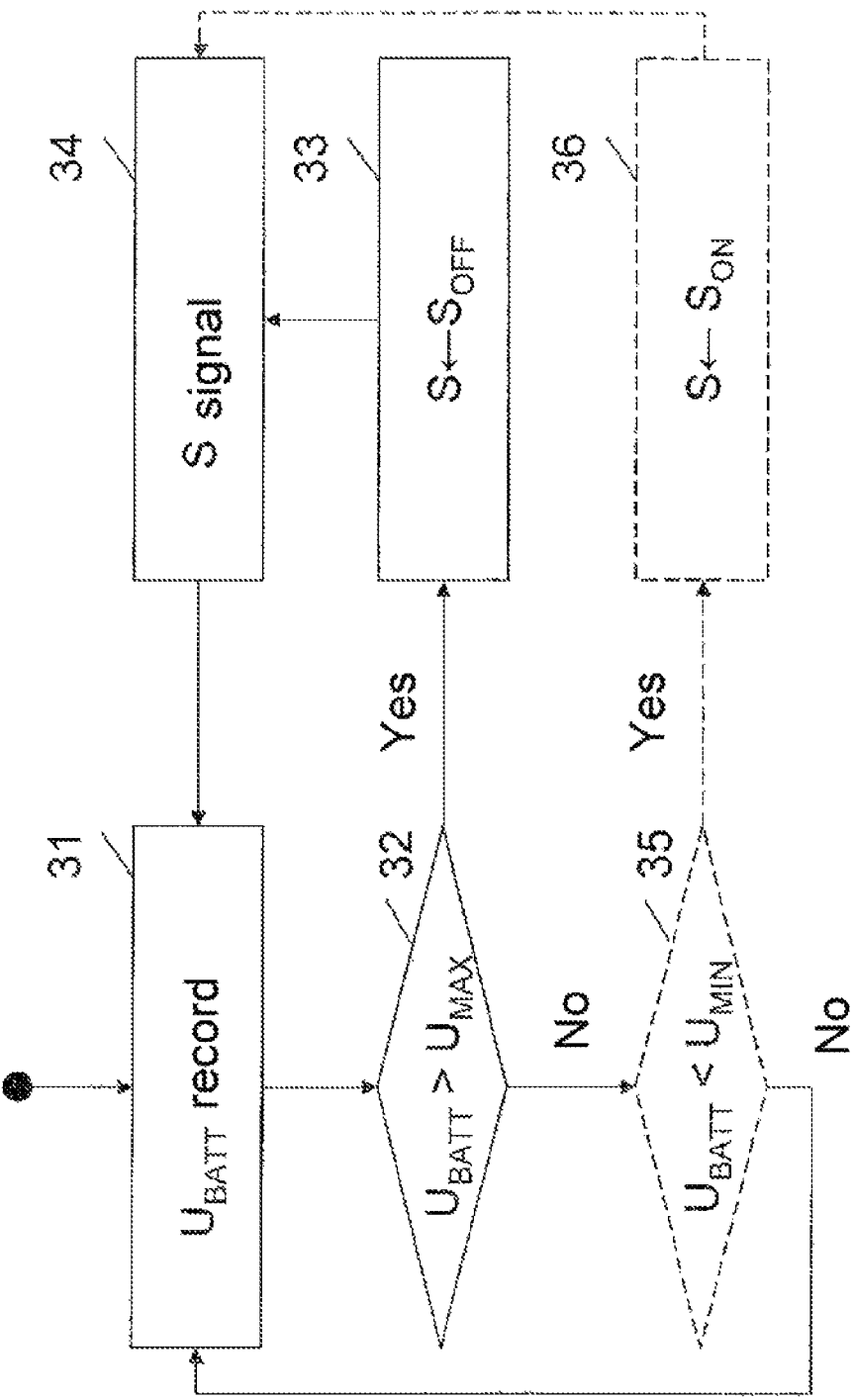
FIG. 3 shows a flowchart of a method for monitoring a state of charge of a rechargeable battery for an electronic device.

FIG. 3 shows a method 30 for monitoring a battery voltage $U_{BATT}$ of a rechargeable battery 3. In this case, the method shown in FIG. 3 represents an example of the monitoring of different states of the electronic device 1.

In a step 31, a battery voltage $U_{BATT}$ of a rechargeable battery is recorded by a monitoring circuit. By way of example, the monitoring circuit may be a discrete analog circuit which monitors the battery voltage $U_{BATT}$ or a discharge current I, or may be a part of the first controller 4 as in one of the examples shown in FIG. 1 or 2.

A check is carried out in a step 32 to determine whether the recorded battery voltage $U_{BATT}$ is above a predetermined upper limit value $U_{MAX}$. By way of example, a voltage which indicates that the rechargeable battery 3 is more than 95 percent charged can be defined as a threshold value $U_{MAX}$.

If this is the case, a control signal S is set to a value $S_{OFF}$ in a step 33. By way of example, after evaluation of the battery voltage $U_{BATT}$, the first controller 4 can write an appropriate register value to a control circuit, or can transmit this to the modulation apparatus 5.

In a further method step 34, the control value S that is provided is signaled to the power adapter 2. By way of example, this can be done by the modulation apparatus 5, by modulation of a radio-frequency AC voltage signal onto an operating voltage $U_B$ of the supply line 9. Alternatively, different signaling of the control signal S is also possible, for example, by transmission via the data line 19. In this case, the signaling in step 34 can be carried out either at regular times, when a predetermined event occurs, for example, identification of a changed battery voltage $U_{BATT}$ by the first controller 4, or on demand by the second controller 11. The method is then resumed in step 31, by detecting a new battery voltage $U_{BATT}$.

If, in step 32, the battery voltage $U_{BATT}$ is not above the predetermined upper limit value $U_{MAX}$, an optional step 35 is carried out to check whether the operating voltage $U_B$ is below a lower predetermined limit value $U_{MIN}$. By way of example, the second limit value $U_{MIN}$ may be a battery voltage $U_{BATT}$ which indicates that the rechargeable battery 3 has less than ten percent charge.

If this is found, a switch-on signal $S_{ON}$ is produced as the control signal S in a subsequent step 36. The switch-on signal $S_{ON}$ is then once again transmitted to the power adapter 2 in step 34.

If the voltage $U_{BATT}$ is below the first limit value $U_{MAX}$ but above the second limit value $U_{MIN}$, the method is continued in step 31, without any need to produce or signal a new control signal S.

FIG. 4 shows a corresponding method 40 for the power adapter 2 to monitor control signals S produced by the electronic device 1.

A control signal S is received in a step 41. By way of example, a demodulation apparatus 12 can be used to demodulate a radio-frequency AC voltage signal from a power supply line 9. Alternatively, the control signal S can also be transmitted by different means, for example, by an additional data line 19, to the power adapter 2, where it is received.

In a step 42, the second controller 11 checks whether the transmitted control signal S is a switch-off signal $S_{OFF}$. If this is the case, the converter circuit 10 is disconnected from the power supply system input 16 in a subsequent step 43. For example, an electronic relay which connects the power supply system input 16 to the converter circuit 10 can be opened. Alternatively, a thyristor which is used for connection can no longer be supplied with a trip signal or similar operation signal, as a result of which it is switched off at the next phase crossing of the primary power supply system AC voltage.

The method is then continued in step 41 by the second controller 11 for the power adapter 2 continuing to monitor an input for reception of control signals S. Preferably, when it is disconnected from the power supply system, the second controller 11 is for this purpose supplied via the power supply line 9 from the rechargeable battery 3 in the electronic device 1. Alternatively, a supply can also be provided via a battery installed in the power adapter 2 or a supply on the primary side from the power supply system, for example, with a low-power and efficient auxiliary converter.

If the control signal S in step 42 is not a switch-off signal $S_{OFF}$, an optional step 44 is carried out to check whether the control signal is a switch-on signal $S_{ON}$. If this is the case, the converter circuit 10 is connected to the power supply system input 16 in step 45, as a result of which the power adapter 2 once again provides an operating voltage $U_B$ to the electronic device 1. The method is then continued once again in step 41.

If the received control signal S is neither a switch-off signal $S_{OFF}$ nor a switch-on signal $S_{ON}$, the second control 11 can carry out further steps, which are not illustrated in FIG. 4, relating to the operation of the converter circuit 10 and/or of the first switching element 17. The method is then continued once again in step 41.

FIG. 5 shows two scenarios 50 and 55 for an electronic device 1 to control a power adapter 2 when being switched on. A switching-on process can in this case be initiated by the power adapter 2 or the electronic device 1.

In the first scenario 50, a switch-on signal for the power adapter 2 is produced in a first step 50.1. By way of example, the second switching element 18 for the power supply system disconnecting means 20 can be operated manually. In this way, the converter circuit 10 is connected to the power supply system input 16, in response to which the converter circuit 10 provides an operating voltage $U_B$ for the second controller 11.

In a step 50.2, the second controller 11 identifies that the power adapter 2 has been activated and checks predetermined operating data for the electronic device 1 by a request. By way of example, the power adapter 2 can request the electronic device 1 to determine a charge capacity, a charging voltage or a charging current of a rechargeable battery 3.

In a step 50.3, the first controller 4 records the request from the second controller 11 and, for example, checks the capacity and the state of charge of the rechargeable battery 3 in the electronic device 1. As soon as the required data has been signaled back from the battery 3 to the first controller 4 in a further step 50.4, this data is transmitted back to the power adapter 2 and its second controller 11, by a further message.

In response to this, the controller 11 configures the converter circuit 10 to provide a suitable operating voltage $U_B$ or a suitable operating current I for supplying the electronic device 1 and/or for charging a rechargeable battery 3 which is accommodated in the electronic device 1. This is illustrated by the step 50.5 in FIG. 5.

The second scenario 55 shows the process of switching on the electronic device 1, with the power adapter 2 subsequently being connected to the power supply system input 16.

For this purpose, a further component 21 of the electronic device 1, for example, a switch-on button on the electronic device 1, a voltage monitoring circuit for the battery 3 or a time controller for the electronic device 1, transmits a switch-on request to the first controller 4 in a step 55.1.

In a step 55.2, in response to this, the first controller 4 transmits a switch-on signal $S_{ON}$ to the second controller 11. In a step 55.3, the second controller 11 transmits a suitable operating signal to the power supply system disconnecting means 20 to connect the converter circuit 10 to the power supply system input 16. This is done in step 55.4.

FIG. 6 shows two further scenarios for controlling a power adapter 2 for a device arrangement. The third scenario 60 illustrates improved operation of the power adapter 2 for rapid charging of a rechargeable battery 3. The fourth scenario 65 shows a procedure for switching off the electronic device 1.

In the third scenario 60, the first controller 4 identifies that rapid charging of the rechargeable battery 3 is desired. By way of example, this can be requested explicitly by a further component 21 of the electronic device 1, or can be determined automatically by the first controller 4 on the basis of the rechargeable battery 3 having been completely discharged.

At the start of a step 60.1, the first controller 4 provides a control signal $S_{FAST}$ to activate a rapid charging function of the power adapter 2. The control signal $S_{FAST}$ is transmitted to the second controller 11. In a step 60.2, the second controller 11 configures the converter circuit 10 by transmitting appropriate operating signals such that it outputs a particularly high operating current I to the electronic device 1. This is done in step 60.3.

The first controller 4 continuously monitors the battery voltage $U_{BATT}$ of the rechargeable battery 3. If it is found in a step 60.4 that the rechargeable battery has exceeded a first threshold voltage, for example, because the rechargeable battery 3 is charged up to 85 percent, the first controller 4 transmits a further signal $S_{NORMAL}$ to the second controller 11. The second controller 11 evaluates the control signal $S_{NORMAL}$ in a step 60.5, and, in a step 60.6, configures the converter circuit 10 such that this now provides a normal or reduced current I to the electronic device 1.

In a step 60.7, the first controller 4 identifies that the rechargeable battery 3 has exceeded a further threshold value. Complete charging of the rechargeable battery 3 can be identified, for example, by identification of an operating temperature of the rechargeable battery 3 or of a charging voltage curve of the rechargeable battery 3. In response to this, the first controller 4 transmits a switch-off signal $S_{OFF}$ to the second controller 11, which receives this in a step 60.8. As a reaction to receiving the control signal $S_{OFF}$, the second controller 11 interrupts the first switching element 17 of the power supply system disconnecting means 20, and thus disconnects the converter circuit 10 from the power supply system input 16. This is illustrated as step 60.9 in FIG. 6.

The charging method illustrated in the third scenario 60 for the rechargeable battery in the electronic device 1 allows a rechargeable battery 3 to be charged particularly rapidly, and at the same time disconnection as required of the power adapter 2 from a power supply system input 16.

In conjunction with further components of the electronic device 1, for example, an energy-saving circuit or energy-saving software for a laptop, particularly energy-saving control methods can be carried out for the device arrangement. For example, it is possible to disconnect the power adapter 2 from a power supply system until a state of charge of a rechargeable battery 3 has fallen below a predetermined level, and for the rechargeable battery 3 to be recharged with a high current only after this. The cyclic disconnection and connection of the converter circuit 10 from and to the power supply system input 16 makes it possible to ensure the mean electrical power consumption from a power supply system during continuous operation of the electronic device 1. At the same time, when in the switched-on state, the converter circuit 10 operates close to its maximum power, and therefore at higher efficiency.

The fourth scenario 65 shows the electronic device 1 being switched off by a further component 21 of the electronic device. In a step 65.1, the component 21 transmits a switch-off request to the first controller 4, initiated, for example, by operating a standby key or energy-saving key on the electronic device 1. In a step 65.2, the first controller 4 then transmits a switch-off signal $S_{OFF}$ to the second controller 11.

In a step 65.3, the second controller 11 receives the switch-off signal $S_{OFF}$ and, in response to this, transmits a request back to the first controller 4. By way of example, the second controller 11 can ask the first controller 4 whether a monitoring function is active in the electronic device 1, for example, a so-called "wake-on" LAN function (WoL) or a timer function, before the second controller 11 disconnects the converter circuit 10 from the power supply system input 16. In a step 65.4, the first controller 4 transmits the required information back to the second controller 11.

If the first controller 4 or the second controller 11 comes to the conclusion that there is no longer a need for the electronic device 1 to be supplied with any more power from the power adapter 2, for example, because no monitoring function of the electronic device 1 is activated or a state of charge of a rechargeable battery 3 is adequate to supply the electronic device 1 with a battery voltage $U_{BATT}$ over a relatively long time period, the converter circuit 10 is disconnected from the power supply system input 16 in a step 65.5.

The fourth scenario 65 illustrates that the functionality for operating the power adapter 2 by bidirectional communication between the electronic device 1 and the power adapter 2 can be distributed virtually as required between the first controller 4 and the second controller 11. In particular, the first controller 4 and the second controller 11 can interchange with one another information relating to parameter values of the converter circuit 10, of the rechargeable battery or of further components 21 in the electronic device to determine an optimum strategy for operating the power adapter 2.

It should be noted that the scenarios 50, 55, 60 and 65 illustrated in FIGS. 5 and 6 are of only an exemplary character, and that a multiplicity of further operating options are possible for the power adapter 2 for the device arrangements according to the described examples.

The invention claimed is:

1. A device arrangement comprising: an electronic device having a rechargeable battery and a power adapter which can be electrically coupled to the electronic device and has a converter circuit for producing at least one operating voltage ($U_B$) for the electronic device from a supply voltage from a power supply system at a voltage output, wherein the operating voltage ($U_B$) is a DC voltage, the voltage output of the power adapter and the electronic device can be connected to one another via at least one power supply line to transmit the DC voltage, and the electronic device has a monitor that monitors at least one state of the electronic device and/or of the rechargeable battery, a first controller that produces at least one control signal (S) as a function of the monitored state, and a first signal device that signals the produced signal (S) to the power adapter, which first signal device is designed to modulate a radio-frequency AC voltage signal which is associated with the control signal (S), onto the power supply line, and the power adapter has a power supply system disconnector that electrically disconnects the converter circuit from the power supply system, a second signal device that identifies a signaled control signal (S) from the first signal device, which second signal device is capacitively coupled to the voltage output and designed to demodulate the modulated control signal (S) from the radio-frequency AC voltage signal, and a second controller that operates the power supply system disconnector as a function of the identified control signal (S).

2. The device arrangement according to claim 1, wherein the second controller disconnects the converter circuit from the power supply system by the power supply system disconnector upon identifying a switch-off signal ($S_{OFF}$) of the first controller.

3. The device arrangement according to claim 1, wherein the second controller connects the converter circuit to the power supply system with the power supply system disconnector upon identifying a switch-on signal ($S_{ON}$) of the first controller.

4. The device arrangement according to claim 1, wherein the second signal device additionally transmits control signals (S) to the first signal device.

5. The device arrangement according to claim 4, wherein the second controller transmits control signals (S) to check device characteristics of the electronic device to the first controller.

6. The device arrangement according to claim 4, wherein the second controller transmits control signals (S) for parameter values relating to operating voltages and/or operating currents which can be produced by the power adapter to the first controller.

7. The device arrangement according to claim 1, wherein the power supply system disconnect device has an electrically operable switching element, and the second controller applies an electrical switching voltage obtained from the rechargeable battery to the electrically operable switching element.

8. The device arrangement according to claim 7, wherein the power supply system disconnector additionally has a manually operable switching element, wherein the manually operable switching element switches on the power adapter independently of a voltage ($U_{BATT}$) of the rechargeable battery.

9. A method for switching a power adapter having a voltage output for connecting an electronic device, wherein the electronic device and the power adapter can be connected to one another via at least one power supply line for transmitting a DC voltage from the voltage output for operation of the electronic device, comprising:
    monitoring a state of the electronic device and/or a state of a rechargeable battery for the electronic device;
    producing at least one control signal (S) as a function of the monitored state by the electronic device;
    signaling the at least one produced control signal (S) from the electronic device to the power adapter by modulating a radio-frequency AC voltage signal associated with the control signal (S) onto the power supply line;
    identifying the signaled control signal (S) with the power adapter by demodulating the modulated control signal (S) from the radio-frequency AC voltage signal; and
    operating a power supply system disconnector in the power adapter that disconnects or connects a converter circuit from or to a power supply system when the power adapter has identified a switch-off signal ($S_{OFF}$) or a switch-on signal ($S_{ON}$) in the identification step.

10. The method according to claim 9, wherein a monitoring circuit monitors at least the state of charge of the rechargeable battery in the monitoring step.

11. The method according to claim 9, wherein a monitoring circuit monitors at, least the operating state of the electronic device in the monitoring-step.

12. The method according to claim 9, further comprising:
    transmitting operating state data from the electronic device to the power adapter; and
    operating the power supply system disconnector and/or, the converter circuit as a function of the transmitted operating state data.

13. The method according to claim 12, wherein a rapid charging current, a normal charging current, a maintenance charging current, an operating current, an operating voltage, a state of charge, a standby state, an energy saving state and/or a normal operating state are/is transmitted to the power adapter in the step of transmitting operating state data.

14. The method according to claim 9, further comprising:
    checking parameters of the electronic device by the power adapter, and
    operating the power supply system disconnector and/or the converter circuit as a function of the checked parameters.

15. The method according to claim 14, wherein a time and/or a time duration of a most recent charge of the rechargeable battery, a state of charge of the rechargeable battery, an energy-saving setting and/or a power supply system disconnection setting of the electronic device or an operating, state of the electronic device are/is checked in the step of parameter checking.

* * * * *